United States Patent
Jørgensen et al.

(10) Patent No.: US 8,049,352 B2
(45) Date of Patent: Nov. 1, 2011

(54) APPARATUS AND METHOD FOR CONTROLLING THE REACTIVE POWER FROM A CLUSTER OF WIND TURBINES CONNECTED TO A UTILITY GRID

(75) Inventors: Allan Holm Jørgensen, Aalborg Ø (DK); Lars Helle, Suldrup (DK); Leonard Schaier, Port Washington, NY (US)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/809,652

(22) PCT Filed: Dec. 17, 2008

(86) PCT No.: PCT/EP2008/067694
§ 371 (c)(1),
(2), (4) Date: Aug. 5, 2010

(87) PCT Pub. No.: WO2009/083445
PCT Pub. Date: Jul. 9, 2009

(65) Prior Publication Data
US 2010/0308585 A1    Dec. 9, 2010

Related U.S. Application Data

(60) Provisional application No. 61/009,596, filed on Dec. 28, 2007.

(30) Foreign Application Priority Data

Feb. 28, 2008    (DK) ................................. 2008 00284

(51) Int. Cl.
*F03D 9/00*    (2006.01)
*H02P 9/04*    (2006.01)

(52) U.S. Cl. ........................................... 290/44; 322/44
(58) Field of Classification Search .................... 290/44, 290/55; 322/44, 89; 415/1; 60/398; 416/1; 307/151, 153
See application file for complete search history.

(56) References Cited

U.S. PATENT DOCUMENTS 4,994,684 A    2/1991    Lauw et al.
(Continued)

FOREIGN PATENT DOCUMENTS

DE    19652673 A1    6/1998
(Continued)

OTHER PUBLICATIONS

European Patent Office, International Search Report issued in related International Application No. PCT/EP2008/067694 dated Mar. 31, 2009.
European Patent Office, International Preliminary Report on Patentability issued in related International Application No. PCT/EP2008/067694 dated Apr. 30, 2010.

*Primary Examiner* — Julio Gonzalez
(74) *Attorney, Agent, or Firm* — Wood, Herron & Evans, LLP

(57) ABSTRACT

Methods for increasing a total reactive power capability of a cluster of wind turbines operationally connected to a grid and systems for carrying out the methods. The method includes generating a voltage value representative of a grid voltage level, determining a total required reactive power value based on the voltage value, and activating at least one wind turbine in said cluster to increase the total reactive power capability from a present value to the required total reactive power value by a predetermined amount.

5 Claims, 10 Drawing Sheets

U.S. PATENT DOCUMENTS

| | | |
|---|---|---|
| 5,083,039 A | 1/1992 | Richardson et al. |
| 5,225,712 A | 7/1993 | Erdman |
| 6,137,187 A | 10/2000 | Mikhail et al. |
| 6,924,565 B2 * | 8/2005 | Wilkins et al. .................. 290/44 |
| 6,965,174 B2 | 11/2005 | Wobben |
| 2002/0029097 A1 * | 3/2002 | Pionzio et al. ................ 700/286 |
| 2004/0178639 A1 | 9/2004 | Wobben |
| 2007/0233406 A1 * | 10/2007 | Delmerico ..................... 702/65 |
| 2008/0258558 A1 * | 10/2008 | Lathrop et al. .................. 307/29 |
| 2009/0096211 A1 * | 4/2009 | Stiesdal ......................... 290/44 |

FOREIGN PATENT DOCUMENTS

| | | |
|---|---|---|
| DE | 102004048341 A1 | 4/2006 |
| EP | 1508951 A1 | 2/2005 |
| EP | 1841037 A2 | 10/2007 |
| WO | 2006120033 A2 | 11/2006 |
| WO | WO 2009083446 A2 * | 7/2009 |
| WO | WO 2009083447 A2 * | 7/2009 |

* cited by examiner

| Index | Turbine ID | Preset Q values |
|---|---|---|
| 80 | 170 | 600 |
| 79 | 160 | 600 |
| . | . | . |
| . | . | . |
|   |   |   |
| . | . | . |
| 5 | 155 | 600 |
| 4 | 134 | 600 |
| 3 | 130 | 600 |
| 2 | 128 | 600 |
| 1 | 101 | 600 |
|   |   |   |
| 1 | 101 | -750 |
| 2 | 128 | -750 |
| 3 | 130 | -750 |
| 4 | 134 | -750 |
| 5 | 155 | -750 |
| . | . | . |
| . | . | . |
| . | . | . |
| 79 | 160 | -750 |
| 80 | 170 | -750 |

Cluster generating 1800 VArs (+Q)

All Turbines deactivated

Cluster absorbing 2250 VArs (-Q)

Fig. 7

APPARATUS AND METHOD FOR CONTROLLING THE REACTIVE POWER FROM A CLUSTER OF WIND TURBINES CONNECTED TO A UTILITY GRID

FIELD OF THE INVENTION

The present invention relates to controlling the reactive power from a cluster of wind turbines to control voltage on an electric power grid, and, more particularly, to an apparatus and method for controlling the reactive power contribution of individual turbines in the cluster by using on-off control rather than linear control of each turbine.

BACKGROUND OF THE INVENTION

A wind turbine is an energy converting device that converts kinetic energy in the wind into electrical energy for use by customers connected to a utility power grid. This type of energy conversion typically involves using wind to turn turbine blades that, in turn rotates the rotor of an AC electrical generator either directly or through a gearbox.

The electrical power available from a wind driven generator and supplied to a utility grid is a function of the power available from the wind, its speed, losses in the grid and the characteristics of the distribution system and loads connected thereto. Because the wind speed and load fluctuates, voltage levels in the grid vary. Likewise since most electric power transmission components have a significant reactive component; voltages in the grid are also a function of the reactive characteristics of loads and components connected to the grid.

To prevent damage to equipment, grid voltage must be held within certain tolerances. One method of supporting grid voltage control is the use of suppliers or absorbers of variable amounts of reactive power to compensate for voltage changes due to the reactive nature of the grid. When overhead lines are primarily inductive, for example, a passive device such as an inductor absorbs reactive power and tends to lower grid voltages while a capacitor supplies reactive power which tends to raise grid voltages The primary electrical output of an AC generator is from its stator. The output from the stator can be directly connected to the grid or pass through a power converter. One common generator of prior art systems is the doubly-fed induction generator (DFIG) where the output from the stator is controlled by the current in its rotor. The stator in such a system can be directly connected to the grid because the stator voltage and frequency, being controlled by the rotor, can be forced to match the grid voltage and frequency.

A DFIG can also be used as a supplier or absorber of reactive power and therefore contribute to voltage control. The state of the machine depends on whether the level of rotor current provided is greater or less than that needed to provide sufficient flux to generate rated output voltage. When excess current is applied to the rotor of a DFIG the machine is considered to be overexcited. In this state more flux than is necessary is generated by rotor current, the machine supplies or generates reactive power from the stator. By convention, the reactive power from the generator is considered to be positive (flowing from the generator) and typically labeled "+Q".

If on the other hand the machine receives too little rotor current it is considered to be under excited. In this state the machine absorbs reactive power into the stator to help supply flux. By convention, the reactive power is considered to be negative (flowing into the generator) and typically labeled "−Q".

A non-DFIG such as a synchronous generator or cage induction machine can also be used as the electrical generator in a wind turbine system that provides controlled reactive power. When these machine types are used in a variable speed configuration a full converter is needed between the stator output and a utility grid. Modern full converters used in wind turbine applications utilize self commutated devices which permit control of the ratio of real to reactive power as well as control of reactive power substantially independent of real power. Prior art systems disclosed in U.S. Pat. Nos. 5,083,039 and 5,225,712 are examples of wind turbines that use a full converter and disclose power factor or reactive power control. Likewise for these systems the direction of reactive power flow (+Q or −Q) is based on the phase relationship between output voltage and current but the conventions regarding the sign of Q is the same as for generators; +Q indicates that the converter is supplying reactive power and −Q indicates that it is absorbing reactive power.

In some prior art systems, when two or more turbines are used in a wind farm a control system determines a particular reactive power for the wind farm or park that is based on either a sensed voltage or a system operator command or both. In this case each wind turbine provides substantially the same amount of reactive power. That is the total required reactive power divided by the number of turbines provides the reactive power support.

Alternatively each wind turbine in a park can adjust its reactive power output based on the same sensed voltage (which is transmitted to each turbine) without an intermediate conversion to a reactive power level for the park. An example is the prior art turbine disclosed in U.S. Pat. No. 6,965,174. As disclosed therein, the turbine uses a control system that linearly increases and decreases a phase angle between real and reactive output from each individual wind turbine once the sensed voltage is outside of a deadband.

With the increasing use of wind turbine generated electrical power, the amount of real power and reactive power provided by wind turbines has increased and the turbine's role in the control of grid operations has become of greater significance. Moreover with the ever increasing number of wind turbines grouped in wind parks, having each individual turbine controlling its reactive power in parallel with all others can lead to undesirable control system interactions. Prior art systems such as disclosed in U.S. Pat. Nos. 5,083,039, 5,225,712, 6,137,187 and 4,994,684 disclose arrangements which control reactive power but do so on a per wind turbine basis.

According to embodiments of the present invention reactive power control is provided by the on-off control of a pre-stored value based on an overall reactive power capability of a cluster of turbines. This approach simplifies wind park design and reduces the load on the SCADA data transmission system. This reduced load results from the elimination of a need to continuously communicate to each turbine a reactive power requirement or a sample of the voltage to be controlled.

DESCRIPTION OF THE INVENTION

The present invention provides incremental reactive power control by commanding the activation or deactivation of the reactive power output of one or more turbines, generally one turbine at a time, as grid voltage or other needs change. In a preferred embodiment, the number of wind turbines activated to provide reactive power is proportional to the total reactive power available and voltage deviation from a nominal value.

The reactive power to be supplied is a function of both voltage sensed at a point of common connection (PCC), some other point in a grid, a composite value based on a number of voltage measurements or as a result of a combination of voltage measurements and system needs as determined by a power dispatcher.

A grouping of wind turbines that participate in support of the reactive power needs is herein termed a cluster. If for example there are 100 wind turbines in a wind farm or collection of wind farms but only 80 of those wind turbines are assigned, if called upon, to provide reactive power, then the cluster has 80 turbines.

A park controller maintains a cluster map/table that defines the turbines currently assigned to the cluster and the order in which turbines in the cluster are called upon to contribute their available reactive power.

In one embodiment voltage compensation is achieved by activating a variable number of wind turbines such that each turbine provides a fraction of the reactive power needed to provide voltage change. For example, if the total wind turbine population was 100 wind turbines, and 80 of those wind turbines were assigned to voltage control, and furthermore that each of the wind turbines could generate or absorb 100 kVAr, then the 80 wind turbines could generate or absorb up to 80 100 kVAr or 8 MVAr in increments of 100 kVAr.

A park controller comprises a droop characteristic and logic flow stored in a computer. While the droop characteristic provides a linear relationship between the voltage at the PCC and reactive power, the programmed logic flow breaks the reactive power requirement into discrete steps so that individual turbines can be activated to provide reactive power or deactivated as required. The steps are preferably equal to the rated reactive power from each turbine and for the case above is 100 kVAr.

The sequence and usage of individual turbines is defined in a cluster map/table that preferably defines the order of activation of each turbine. In a preferred embodiment a turbine's position in the map may be altered to achieve the same or variable wear on the turbines within the cluster or to facilitate maintenance. For maintenance and other reasons turbines can be added to or removed from the cluster.

The position in the map of each turbine unit is controlled by management software which preferably is positioned hierarchically giving consideration to maintenance schedules, wear, or such other criteria as established by the wind farm operator. Likewise a turbines position in the map can be determined automatically under computer program control whereby on line time, power output, environmental conditions, etc. or weighted combinations of all or part of such parameters or conditions are considered.

A specific turbine may, for example, be scheduled to be activated for small values of voltage deviations for certain periods of time and for larger deviations for other periods of time. Those turbines that are activated for small voltage changes will be providing reactive power more often than those that are only activated for larger deviations and service scheduling can be adjusted in accordance with usage. As noted, from time to time a turbine may be removed from the cluster, for example, to allow for maintenance and another turbine not previously in the cluster may be substituted.

No continuous signals related to reactive power are sent to a turbine in the cluster. For bus oriented systems it is only necessary to address the particular turbine to be activated and provide two bits of information. These bits define the sign of the reactive power and whether a turbine is deactivated. Moreover, although the preferred embodiment utilizes SCADA for transmitting the on-off signals to each turbine in a cluster, other embodiments may use other paths for reactive power control to decrease response time and take advantage of the inherent noise immunity generally available with simple data packages.

Although the preferred embodiment describes the voltage to be controlled as typically the voltage at the PCC (point of common connection) with its control carried out in the park with respect to that measurement point, it will be readily within the knowledge of one skilled in the art to measure or calculate the voltage on the grid remote from the PCC and provide reactive power calculated on the basis of that voltage information.

BRIEF DESCRIPTION OF THE DRAWINGS

Referring to the figures in which like numbers refer to like elements:

FIG. 7 is a table illustrating a preferred cluster map for the present invention.

Figure 1:
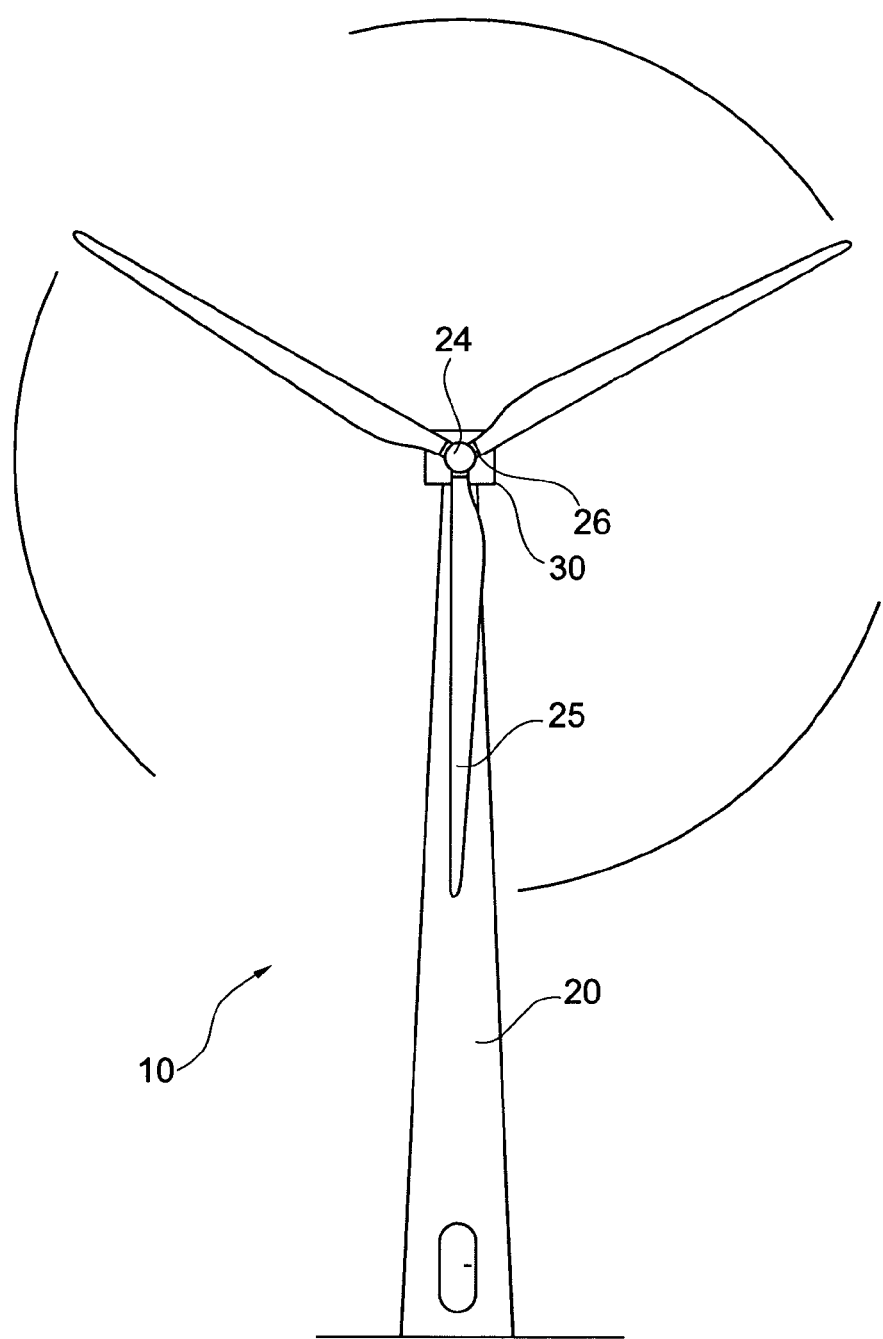
FIG. 1 is an illustration of a typical wind turbine assembly

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

FIG. 1 illustrates a wind turbine 10 supported on a tower 20 and a wind turbine nacelle 30 positioned on top of the tower.

A wind turbine rotor having three wind turbine blades 25 is shown in FIG. 1 connected to the hub 24 through pitch mechanisms 26. Each pitch mechanism 26 includes a blade bearing and pitch actuating means which allows the blade to pitch. The pitch process is controlled by a pitch controller. Details of the blade bearings, pitch actuating means and pitch controller (not shown) are well known in the art.

Figure 2:
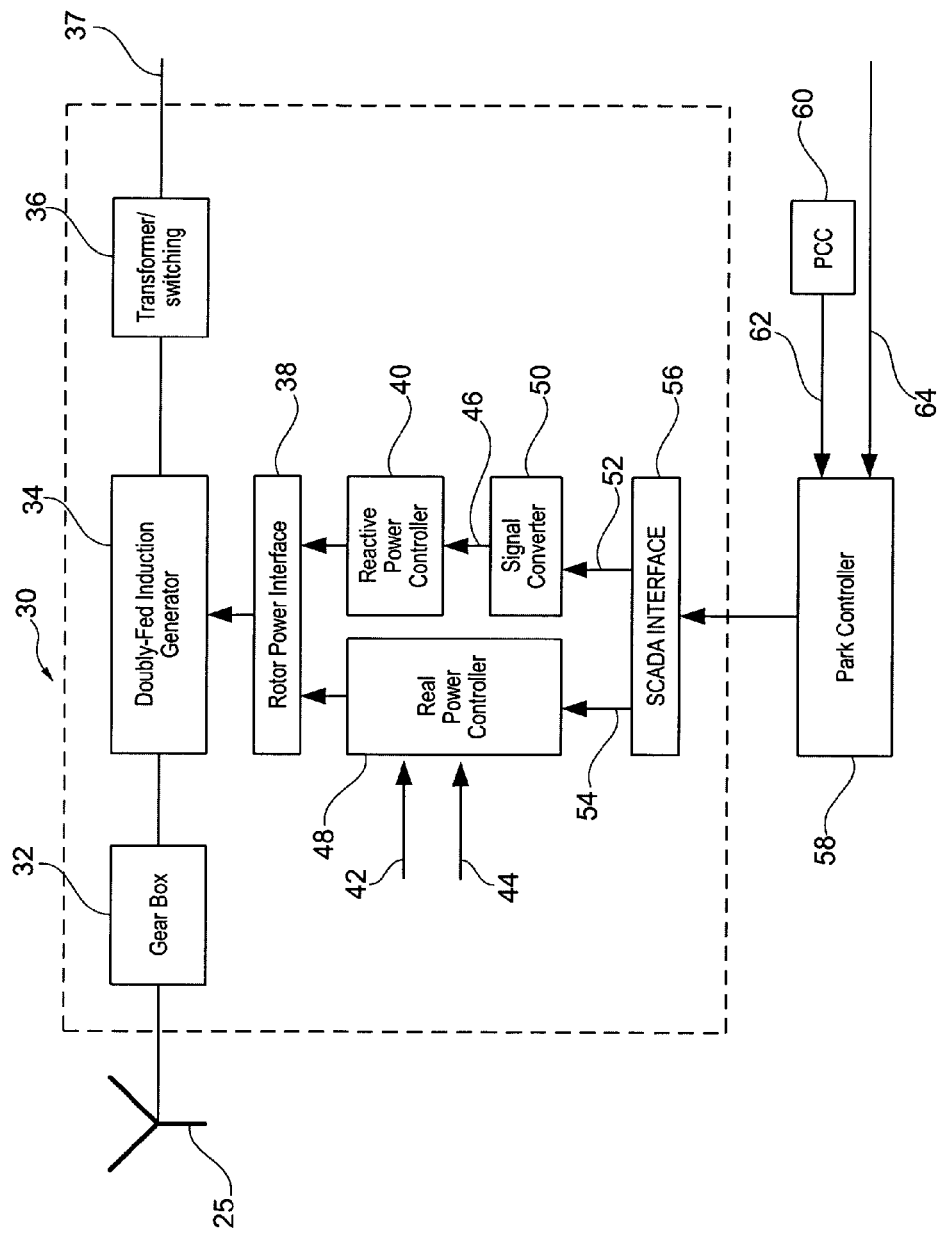
FIG. 2 is a block diagram showing major portions of the wind turbine located under the nacelle.

FIG. 2 shows major elements of a wind turbine located under/within nacelle 30 in block diagram form. Blades 25 mechanically drive generator 34, through gearbox 32, whose output is fed to transformer and switching block 36 and then to wind park substation 210 (shown in FIG. 3.) and an electrical grid (not shown).

Output of generator 34 is controlled via rotor power controller 38 which is responsive to reactive power controller 40 and real power controller 48. Rotor power converter 38 raises/converts the signals from controllers 40 and 48 to a level suitable for driving the rotor of generator 34. The signals for rotor power converter 38 are developed below.

Park controller 58 located in park substation 210 (shown in FIG. 3) comprises a droop characteristic (shown in FIG. 4), a logic flow diagram (shown in FIG. 6) and a cluster map (shown in FIG. 7). While the droop characteristic provides a linear relationship between the voltage at the PCC and reactive power, the programmed logic flow of FIG. 6 breaks the reactive power requirement into discrete steps so that individual turbines can be activated to provide reactive power or deactivated as required.

Figure 3:
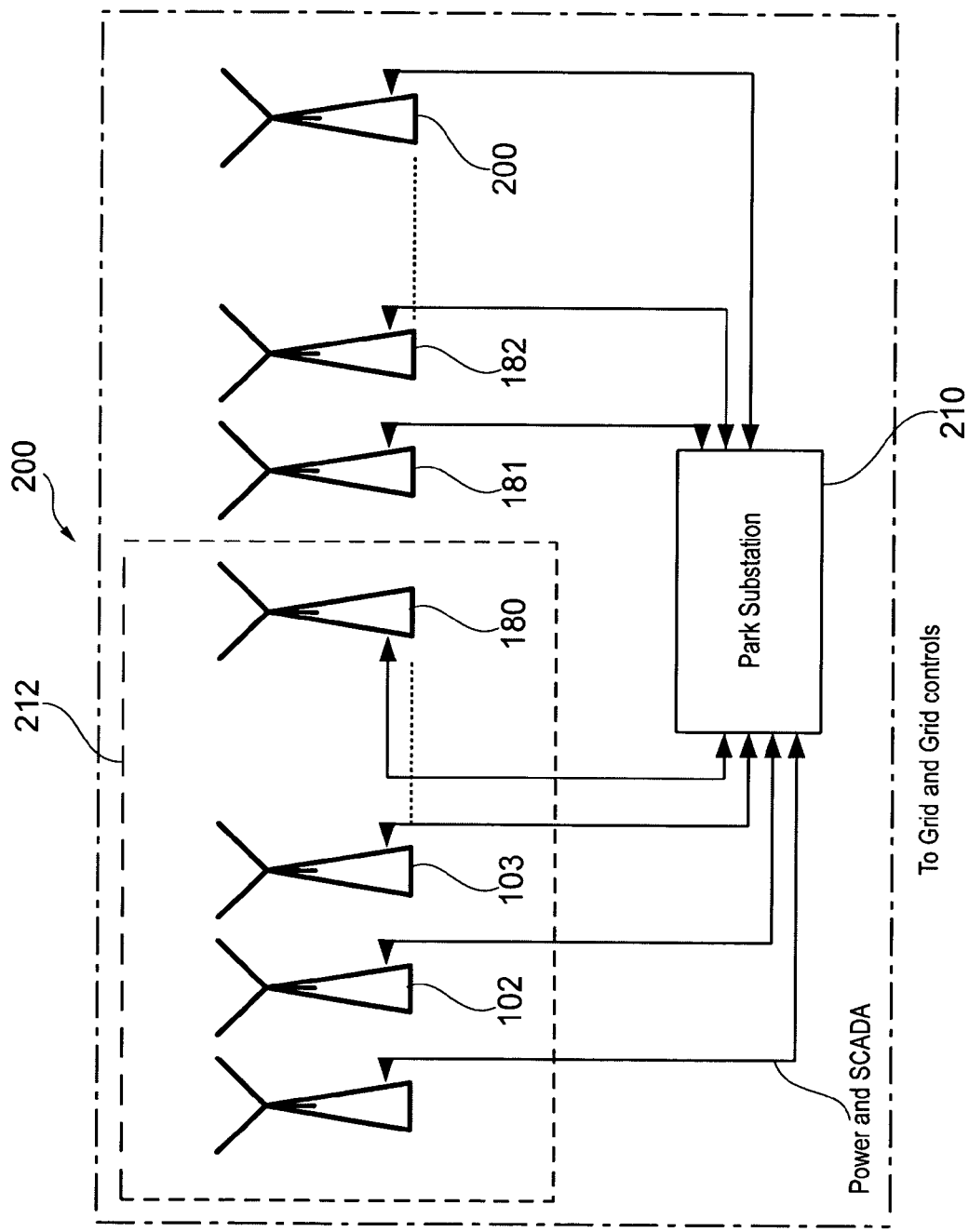
FIG. 3 is block representation of a wind park.

The cluster map of FIG. 7 provides an ordered listing of the turbines in a cluster and the amount and sign of reactive power expected from each turbine in the cluster (A cluster 212 in shown in FIG. 3). As shown in FIG. 7, if the signal converter 50 memories containing positive values of turbines at index values 1, 2 and 3 are activated, then the cluster is producing +1800 vars. Like wise if the negative memories of signal converter 50 of the same turbines were activated then the cluster is absorbing 2250 vars.

Park controller 58 receives a signal representative of a voltage measurement at PCC 60 ($V_{PCC}$), in the grid, or of a composite value based on a plurality of voltage measurements via signal line 62. Likewise, line 64 may receive a reactive power command determined by a system operator as either a particular vars value or in the form of a power factor value which may then be converted to a VAr value. This latter value of reactive power can act as a bias to the reactive power increments controlled by the on-off signals from park controller 58.

Figure 4:
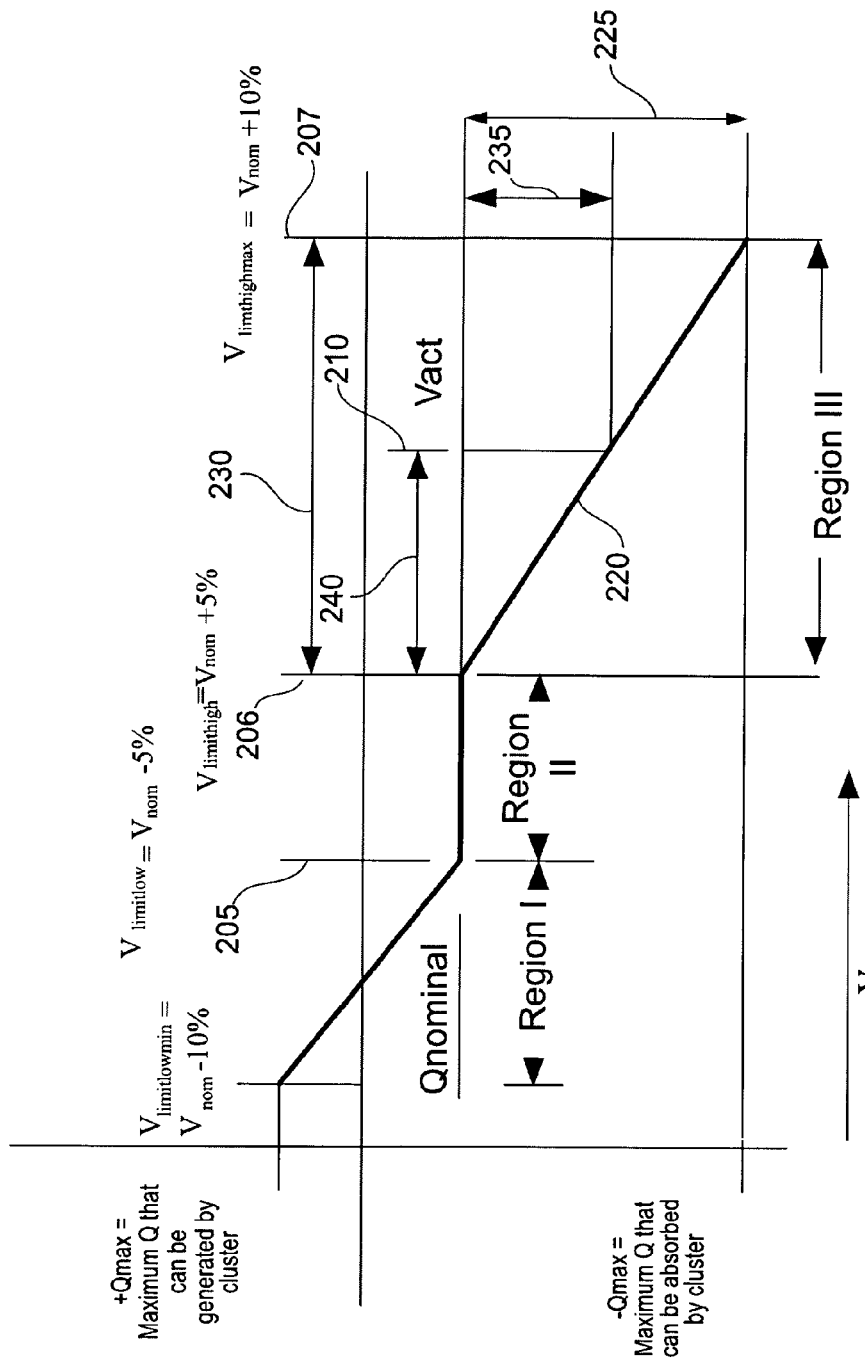
FIG. 4 is a graphical illustration showing reactive power as a function of grid voltage.

The total amount of reactive power required for each sampled value of VPCC is found using the droop type characteristic in FIG. 4. This characteristic includes a region showing an increasing generation of reactive power as grid voltage falls (Region I), a region of substantially fixed reactive power level (Region II) and a region where an increasing grid voltage calls for increased absorption of reactive power (Region III).

Using the notation of FIG. 4 and the geometry of similar triangles we find the relationship between the reactive power and grid voltage changes in Region III is given as follows:

$$Q_{droop} - Q_{nominal} = (Q_{max} - Q_{nominal})/V_{limithighmax} - V_{limit})^* (V_{actual} - V_{limithigh}); \quad [1]$$

where $Q_{droop}$ is the value of Q defined at $V_{actual}$, ($Q_{droop} - Q_{nominal}$) is the total amount of reactive power absorbed as the voltage in the grid rises from $V_{nominalhigh}$ to $V_{actual}$ and ($Q_{max} - Q_{nominal}$) is the maximum reactive power change available from a cluster to cover a voltage range of $V_{limithigh}$ to $V_{limithighmax}$. The range from $V_{limithigh}$ to $V_{limithighmax}$ is indicated by line 230 and preferably has a value of 5% of $V_{nominal}$ while the range of $V_{actual} - V_{limithigh}$ is indicated by line 240.

Figure 5:
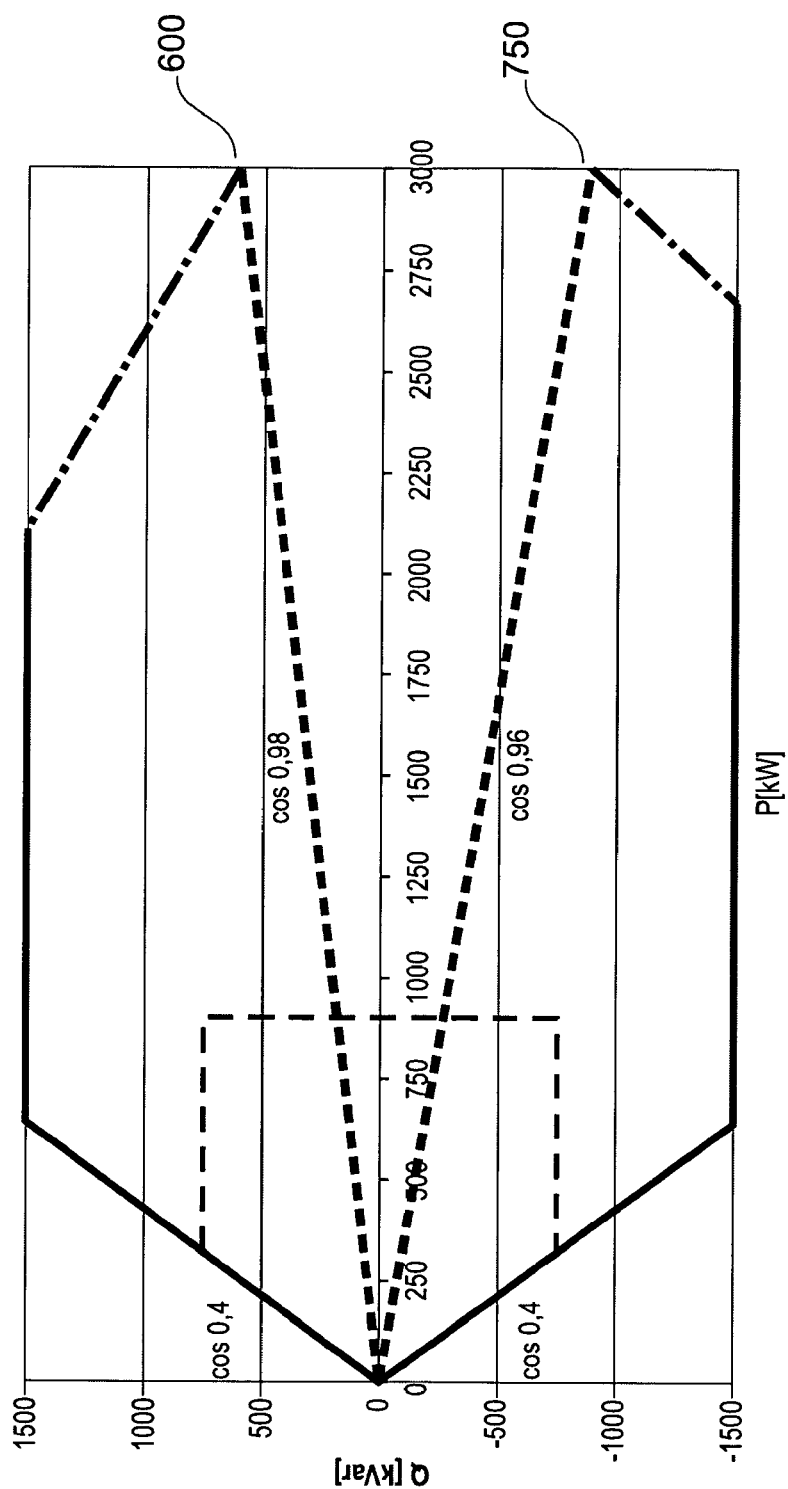
FIG. 5 is graphical representation of the reactive power capabilities of a prior art AC generator.

FIG. 5 illustrates the real and reactive power output of a prior art DFIG operating at or below synchronous speed. As shown in FIG. 5 the generator operating at rated power can generate 600 kvars (and absorb approximately 750 kvars) so that the cluster 212 of FIG. 3 can generate a total of 80×600 kVAr or 48000 kVArs. Therefore with a nominal voltage of 10 kv at the PCC and a Qnominal=0 for the cluster and farm, the number of vars absorbed by the cluster as a function of the actual voltage at the PCC is given by:

$$Q_{droop} = 48 \text{ MVAr } (V_{actual} - V_{limithigh})/(0.05 \times 10,000) = -96 \text{ kvar}(V_{actual} - V_{limithigh}); \quad [2]$$

The required change of reactive power for Region I where the grid voltage is below $V_{nomimallow}$ and falling is developed in a similar manner and yields:

$$Q_{droop} = 60 \text{ MVAr } (V_{actual} - V_{limitlow})/(0.05 \times 10,000) = 120 \text{ kvar}(V_{actual} - V_{limitlow}); \quad [3]$$

where again Qnominal is assumed zero and $V_{limitlowmin} - V_{limitlow} = 0.05 \times 10,000$)

Figure 6:
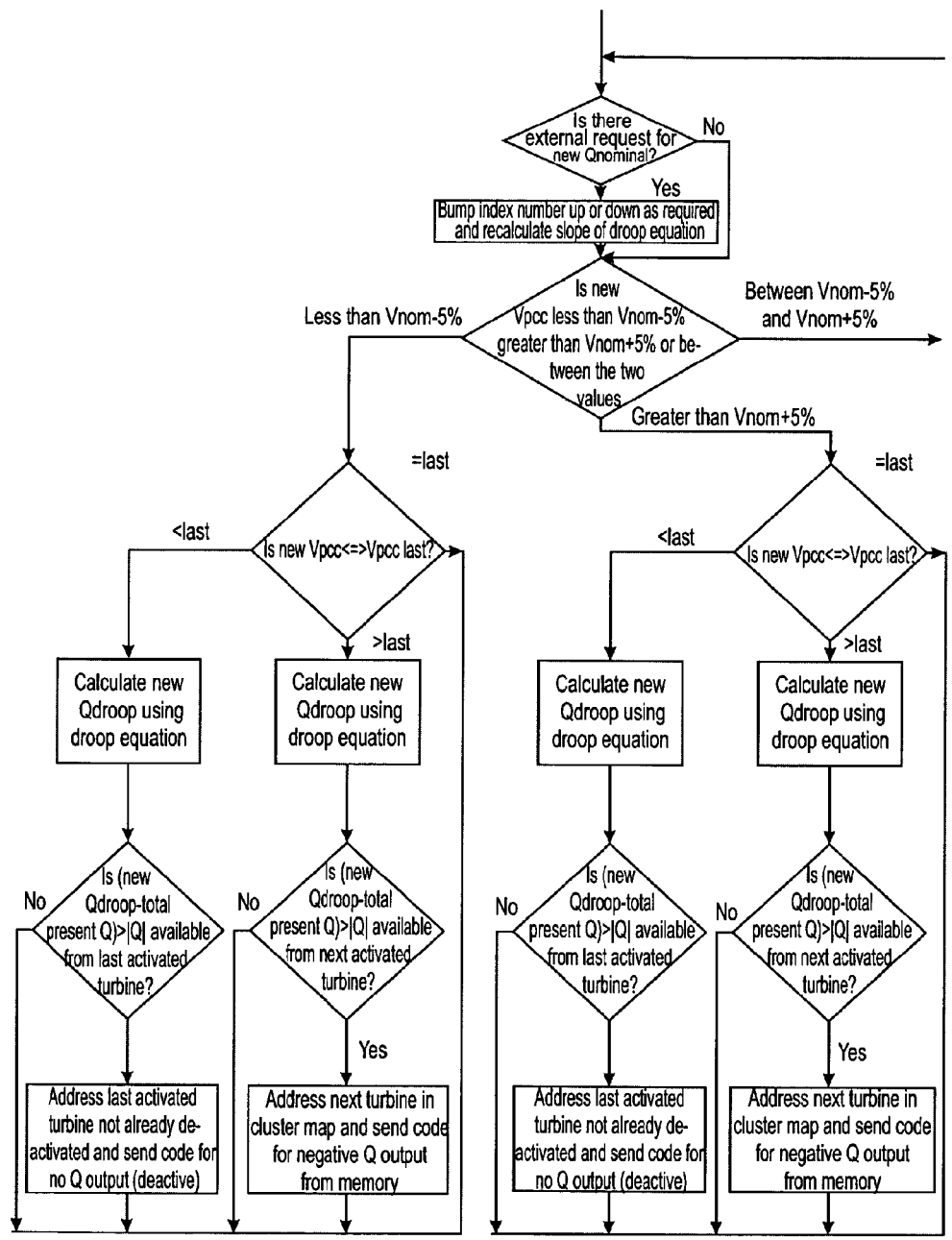
FIG. 6 is a flow diagram illustrating the preferred logic flow for the present invention.

A decision to turn on (activate) or turn off (deactivate) the reactive power value assigned to a particular turbine is made using calculated values from Eq. 2 or 3 as appropriate and the logic of FIG. 6. Simply stated, an implementation substantially as given in FIG. 6 will not allow an index value change or deactivation unless the voltage at the PCC changes sufficiently to require a change in cluster reactive power equal to or greater than the reactive level stored in memory of the next turbine to be activated OR, in the case of a deactivation, is greater than or equal to the value of reactive power provided by the last turbine activated.

When a next turbine is to be activated or a currently activated turbine is deactivated, the address of the of the turbine to be activated or deactivated is read from table 7, a 2 bit code that defines whether a positive, negative or no reactive power is generated and the code is sent, along with a function identifier or label that identifies the code as pertaining to reactive power output, to the turbine to be controlled.

The two bit code generated in park controller 58 is received by signal converter 50 via SCADA interface 56 and signal line 52. Signal converter 50 comprises two memory location for storing a positive and a negative value of reactive power. Signal converter 50 is discussed further in a paragraph that follows.

In a preferred embodiment all wind turbines in a cluster will have substantially the same values stored in their signal converter 50 memory associated with positive reactive power and a different value in memory associated with negative reactive power. This is the case for the preferred embodiment because, as can be seen from the prior art generator of FIG. 5 and discussed above, its ability to deliver positive reactive power is different from its ability to absorb reactive power.

As shown in FIG. 5, if real power demand is lower because of low wind conditions or a reduced maximum power setting communicated by the system operator, the generator of FIG. 5 can deliver up to 1500 kvar. Likewise, local environmental conditions such as consistently high or low ambient temperatures may make it advisable to change the overall reactive power capabilities of each turbine. Therefore the apparatus and method may include the capability to change, via e.g., the SCADA signal, the preset values stored in each wind turbine due to these factors.

Likewise, in an alternate embodiment SCADA can download different values of reactive power for each wind turbine in a cluster to allow for different droop curve shapes as a park controller 58 triggers different turbines in a cluster 212. With this configuration it is possible to offer other profiles to provide either more or less compensation over certain voltage ranges or to create non-linear compensation characteristics.

The signal feeding real power controller 48 includes real power reference 42 (which may be developed from wind speed) and external power limit 44. External power limit 44 may override the real power reference 42 as in, for example, high wind conditions or potentially harmful grid conditions or when it is desirable to limit maximum real power so that the absorption or production of reactive power could be maximized as described above.

Signal converter 50 decodes the 2 bit code received from SCADA interface 56 and converts the code into a command for signal converter 50 to output the contents of one of its two memories (one for a positive reactive power and one for negative value of reactive power), or to output a zero value if a turbine is to deactivated. To save bandwidth the output value from each turbine is latched and does not change unless commanded to do so through SCADA interface 56.

This output of signal converter 50 is preferably provided in digital form to reactive power controller 40 and after processing by reactive power controller 40 is fed to rotor power interface 38 and the rotor connections (not shown) of DFIG 34.

Input signals to real power controller 48 via signal line 54 and signal converter 50 via signal line 52 are also received from SCADA interface 56 as are other messages and commands from park controller 58 located in park substation 210 shown in FIG. 3.

Preferably each turbine records its output voltage before and after a reactive power activation and its active power output when activated or deactivated. By dividing a change in voltage by the reactive power that caused it, an estimate of the impedance (total load) at the measurement point can be made. This is generally calculated for each turbine.

The data can be used to estimate the load at each individual turbine and reflects the characteristics of the farm and the grid as experienced by each turbine. Alternatively, voltage changes as a result of reactive power changes are measured at the PCC and the results provide an estimate of the characteristics of the grid as seen by the complete farm.

Measurement of voltage changes due to reactive power changes at different real power levels yields information regarding transmission line effects between turbines and the PCC, as well as between the farm and the grid. As known to those skilled in the art, transmission line effects can be a function of real power loading.

The data permits condition monitoring of the farm and the grid, as well as optimizing what reactive power values can be contributed for each turbine as a function of its position in the farm. For example, the closer a turbine is to the PCC the greater its contribution of reactive power will have on the voltage changes at the PCC due to changing grid conditions. With knowledge of the influence of each turbines contribution of reactive power to controlling voltage at the PCC, the values of reactive power assigned to each turbine can be to optimized to maximize the benefits of the contributions of each turbine.

Figure 8:
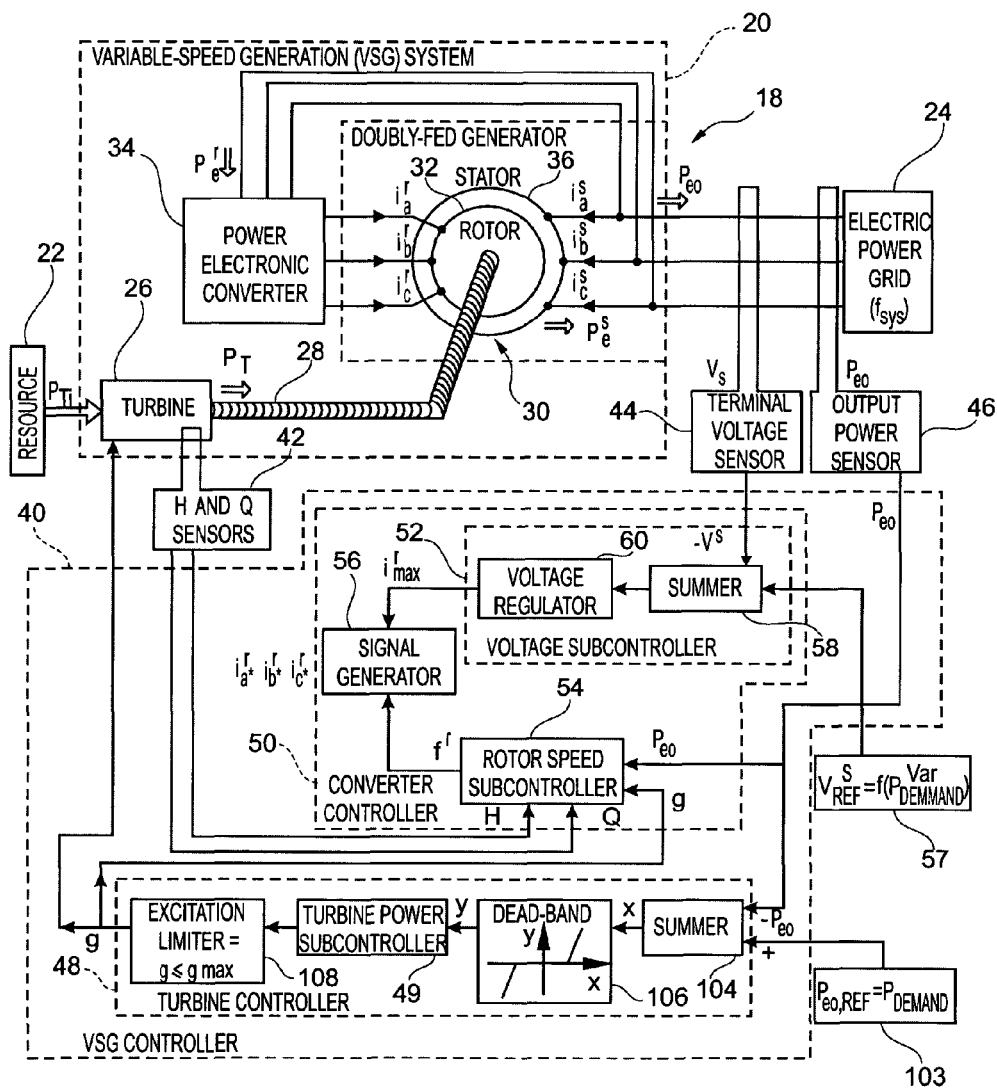
FIGS. 8-10 are block diagrams of prior art wind turbines each provided with the control system of the present invention.
Figure 9:
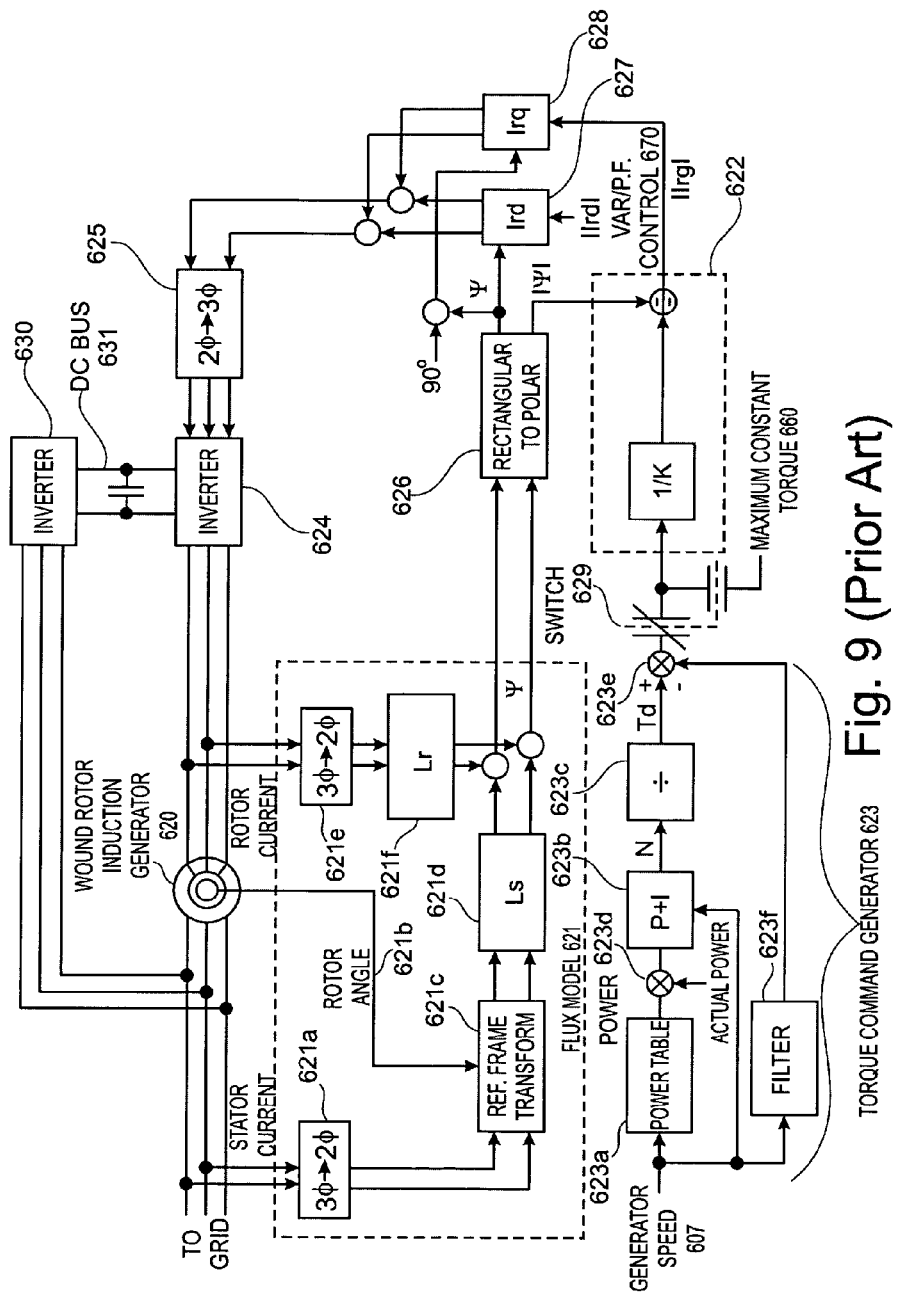
Figure 10:
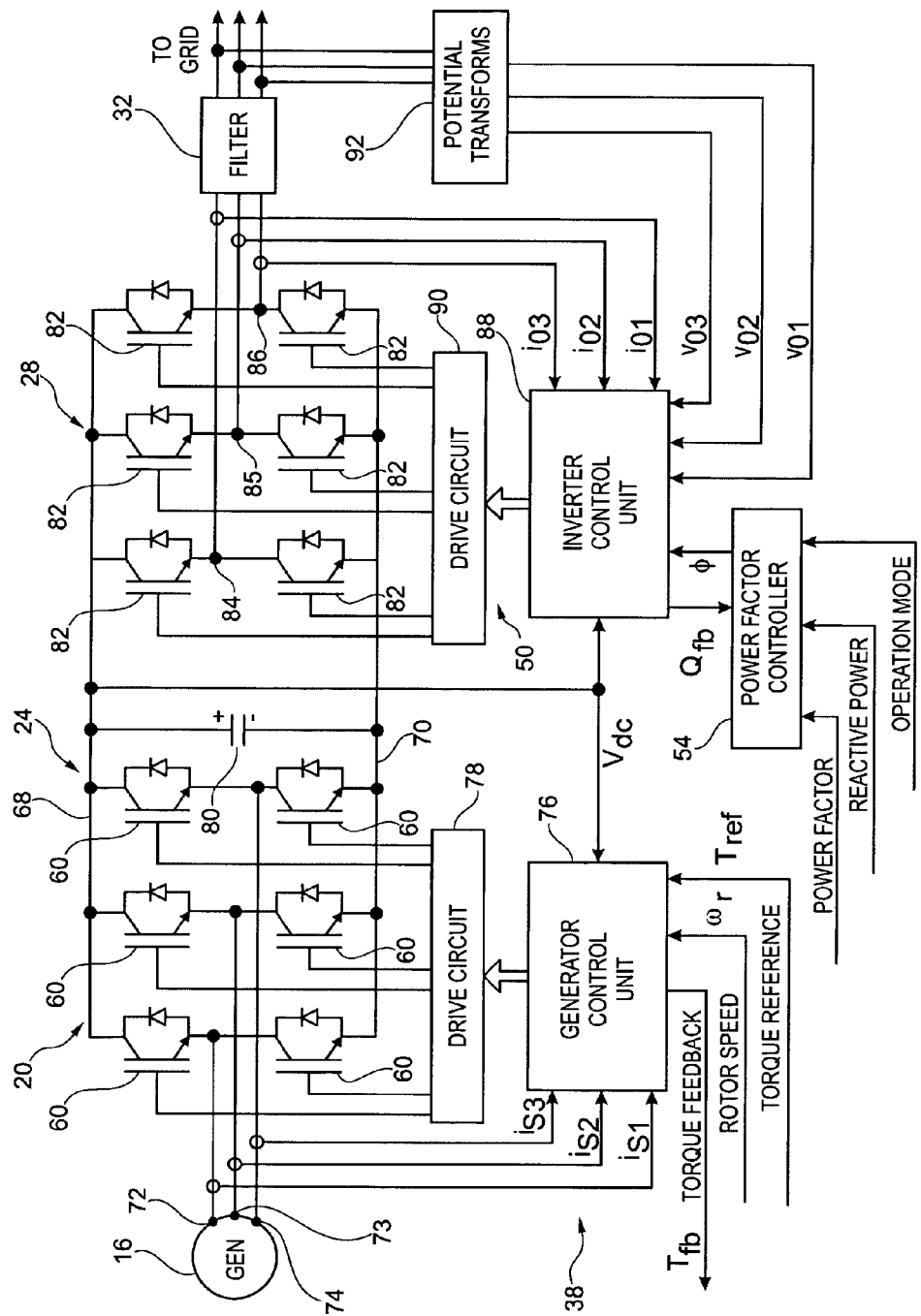

The present invention can be readily incorporated into a number of prior art turbines including but not limited to those disclosed in U.S. Pat. No. 4,994,684 ("the '684 Patent"), U.S. Pat. No. 6,137,187 ("the '187 Patent") and U.S. Pat. No. 5,083,039 ("the '039 Patent). With regard to the '684 Patent the output from the signal converter block 50 would be coupled to the input of block 57 shown in FIG. 8 herein (FIG. 1 of the '684 Patent). Likewise for the system of the '187 Patent, signal converter block 50 would be preferable coupled to the input of block 627 in FIG. 9 herein (FIG. 6b of the '187 Patent) and would be coupled to block 54 of the '039 Patent shown in FIG. 10 herein (FIG. 2 of the '039 Patent).

As one skilled in the art would recognize, and as demonstrated above, the present invention is applicable to wind turbine systems having generators followed by full converters where all power to the grid passes through the full converter or wind turbine systems having partial converters where power to a grid can be take from a stator and a rotor.

Likewise while the present invention has been described in the context of controlling reactive power above and below −5% to +5% of a nominal voltage, a person skilled in the art would recognize that the range could be different than −5% to +5% and in fact be asymmetrical or substantially zero. Moreover while the presents invention has been described using maximum and minimum voltages of +10% and −10% of nominal voltage, these limits as well can be different.

Moreover, in alternate embodiments of the present invention Region II of FIG. 4 extends through Region I whereby the reactive power output of a cluster would be substantially constant from low voltages up to a nominal voltage +5% for example. Alternate embodiments having different ranges for Region II are advantageous configured by simply recalculating a droop characteristic while having a flat region extending from Region II down to low voltage is preferably achieved by limiting turbine activations to those that keep the total cluster reactive power to values in Region II and Region III.

In a further alternative embodiment Regions II and III of FIG. 4 are combined and total reactive power is constrained to values in Regions I and II.

Although the invention has been described by reference to certain embodiments and prior art wind turbines, the invention is not limited to the embodiments described. Modifications and variations will occur to those skilled in the art in light of the teachings. The scope of the invention is defined with reference to the following claims.

The invention claimed is:

1. A method for incrementally increasing a total reactive power capability of a cluster of wind turbines operationally connected to a grid, the total reactive power capability of said cluster being increasable in discrete steps of predetermined reactive power amounts, wherein each wind turbine in said cluster of wind turbines is assigned one predetermined amount of reactive power, the method comprising:
   generating a voltage value representative of a grid voltage level;
   determining a total required reactive power value based on the voltage value; and
   activating at least one wind turbine in said cluster to increase the total reactive power capability of said cluster of wind turbines from a present value to the required total reactive power value, said activation involving a turn on or a turn off of the predetermined amount of reactive power assigned to said at least one wind turbine.

2. A method according to claim 1, wherein the increase of total reactive power capability of said cluster of wind turbines corresponds to an increased absorption of reactive power.

3. A method according to claim 1, wherein the increase of total reactive power capability of said cluster of wind turbines corresponds to an increased generation of reactive power.

4. A method according to claim 1, wherein the predetermined amount of reactive power is based on the reactive power capability of the activated wind turbine.

5. A method according to claim 1, wherein the at least one activated wind turbine is selected from a cluster map, said cluster map defining an order in which the wind turbines of said cluster is activated.

* * * * *

UNITED STATES PATENT AND TRADEMARK OFFICE
CERTIFICATE OF CORRECTION

| | |
|---|---|
| PATENT NO. | : 8,049,352 B2 |
| APPLICATION NO. | : 12/809652 |
| DATED | : November 1, 2011 |
| INVENTOR(S) | : Allan H. Jorgensen et al. |

It is certified that error appears in the above-identified patent and that said Letters Patent is hereby corrected as shown below:

In the Specification:

At column 1, line number 22, change "in turn rotates" to --in turn, rotate--.

At column 3, line number 46, change "turbines" to --turbine's--.

At column 4, line number 18, change "assembly" to --assembly.-- and at line number 21, after "is", insert --a-- and at line number 24, after "is", insert --a--.

At column 5, line number 9, after "212", insert --is-- and at line number 61, change "nomimallow" to --nominallow--.

At column 6, line number 14, after "of the", delete "of the" and at line number 22, change "location" to --locations--.

At column 7, line number 35, change "turbines" to --turbine's-- and at line number 37, after "be", delete "to" and at line number 56, change "take" to --taken--.

At column 8, line number 4, change "presents" to --present--.

In the Claims:

At column 8, claim number 5, line number 56, change "is" to --are--.

Signed and Sealed this
Thirty-first Day of January, 2012

David J. Kappos
*Director of the United States Patent and Trademark Office*